(12) United States Patent  
Imamichi

(10) Patent No.: US 8,614,802 B2  
(45) Date of Patent: Dec. 24, 2013

(54) IMAGE PROCESSING APPARATUS, IMAGE PROCESSING METHOD, AND COMPUTER PROGRAM PRODUCT CONFIGURED TO EXECUTE DATA PROCESSING FOR PLURAL REQUESTS WITHOUT DUPLICATING COMMON DATA PROCESSING

(71) Applicant: Takahiro Imamichi, Kanagawa (JP)

(72) Inventor: Takahiro Imamichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/683,031

(22) Filed: Nov. 21, 2012

(65) Prior Publication Data

US 2013/0077123 A1    Mar. 28, 2013

Related U.S. Application Data

(63) Continuation of application No. 11/700,714, filed on Jan. 30, 2007, now Pat. No. 8,339,620.

(30) Foreign Application Priority Data

Feb. 3, 2006  (JP) ................................. 2006-027559  
Dec. 6, 2006  (JP) ................................. 2006-329990

(51) Int. Cl.  
  *G06F 3/12*    (2006.01)  
  *G06F 15/00*    (2006.01)  
  *G06K 1/00*    (2006.01)

(52) U.S. Cl.  
  USPC ........................... 358/1.13; 358/1.9; 358/1.15

(58) Field of Classification Search  
  None  
  See application file for complete search history.

(56) References Cited

U.S. PATENT DOCUMENTS

| | | | |
|---|---|---|---|
| 5,377,016 A | 12/1994 | Kashiwagi et al. | |
| 5,506,657 A | 4/1996 | Ito et al. | |
| 5,970,224 A | 10/1999 | Salgado et al. | |
| 7,173,721 B1 | 2/2007 | Kobayashi et al. | |
| 2002/0071690 A1* | 6/2002 | Muramatsu | 399/82 |
| 2003/0103232 A1 | 6/2003 | Twede | |
| 2004/0021896 A1 | 2/2004 | Chen | |
| 2004/0046972 A1* | 3/2004 | Shibao | 358/1.1 |
| 2006/0114509 A1* | 6/2006 | Itaki et al. | 358/1.15 |
| 2007/0041032 A1 | 2/2007 | Sugimoto et al. | |

FOREIGN PATENT DOCUMENTS

| | | |
|---|---|---|
| JP | 2000-307834 | 11/2000 |
| JP | 2001-238020 | 8/2001 |
| JP | 2002-44311 | 2/2002 |
| JP | 2005-245000 | 9/2005 |

OTHER PUBLICATIONS

May 10, 2011 Japanese official action in connection with a counterpart Japanese patent application.

* cited by examiner

*Primary Examiner* — Ming Hon  
(74) *Attorney, Agent, or Firm* — Cooper & Dunham LLP

(57) ABSTRACT

An image processing apparatus subjects input image information to a predetermined image processing and outputs the image information. The image processing apparatus includes an UI processor that receives a plurality operation requests for the image information; and a request processor that interprets a combination of an input mode, of a plurality of input modes, which performs input processing, and an output mode, of a plurality of output modes, which performs output processing, and that requests the input processing from the input mode and requests the output processing from the output mode.

16 Claims, 11 Drawing Sheets

| REQUEST | INPUT MODE | PROCESS MODE | OUTPUT MODE |
|---|---|---|---|
| COPY FOR MATERIAL | SCANNING | LAYOUT | PLOTTING |
| RIGHT COPY | SCANNING | REDUCTION | PLOTTING |
| TEST PRINTING | PC DOCUMENT | SAMPLE STAMP PRINTING | PLOTTING |

IMAGE PROCESSING APPARATUS, IMAGE PROCESSING METHOD, AND COMPUTER PROGRAM PRODUCT CONFIGURED TO EXECUTE DATA PROCESSING FOR PLURAL REQUESTS WITHOUT DUPLICATING COMMON DATA PROCESSING

CROSS-REFERENCE TO RELATED APPLICATIONS

The present application is a Rule 1.53(b) continuation of application No. 11/700,714,filed Jan. 30,2007 which claims priority to, and incorporates by reference the entire contents of, Japanese priority documents 2006-027559 filed with the Japanese Patent Office on Feb. 3, 2006 and 2006-329990 filed with the Japanese Patent Office on Dec. 6, 2006.

BACKGROUND OF THE INVENTION

1. Field of the Invention

The present invention relates to a technology for image processing.

2. Description of the Related Art

In digital multifunction products, a plurality of image processing functions such as a copying function, a facsimile (fax) function, a printing function, and a mail transmission function is included. A technology related to the digital multifunction product having these image processing functions is disclosed in Japanese Patent Application Laid-Open No. 2002-44311. In the technology, the digital multifunction product performs a plurality of image processes using a single unit by requesting each of the image processes to each of units that perform individual functions. FIG. 9 is a sequence diagram of a processing of a conventional combined operation. A method of performing image processing on the same image information using the copying function and the fax function is explained with reference to FIG. 9.

In FIG. 9, a user interface (UI) (not shown) is operated, and a UI processor 901 creates a copy request and a fax request. The UI processor 901 sets either one of the created requests as a unit that serves as a function of image processing corresponding to the request. In the case of FIG. 9, the UI processor 901 sends the copy request to a copying unit 902 (step S911). Upon receiving the copy request, the copying unit 902 sends a scan request to a scanner controller 904 that is an input unit of image information (step S912), and sends a plot request to a plotter controller 905 that is an output unit of image information (step S913). More specifically, the copying unit 902 performs the image processing immediately after an input of the image information is started by scanning, and the plotter controller 905 outputs the image information by plotting.

The scanner controller 904 sends a notification on processing progress to the copying unit 902 as needed (step S914). In FIG. 9, the scanner controller 904 sends the notification thereto every time one-page scanning is finished. When accepting the notification, the copying unit 902 sends a screen display request to the UI processor 901 (step S915). The UI processor 901 controls a UI and notifies a user of the number of pages having been scanned. Similarly, the plotter controller 905 sends a notification on processing progress to the copying unit 902 as needed (step S916). In FIG. 9, the plotter controller 905 sends the notification to the copying unit 902 every time one-page plotting is finished. Upon receiving the notification, the copying unit 902 sends a screen display request to the UI processor 901 (step S917). The UI processor 901 controls the UI and notifies the user of the number of pages having been plotted.

When a series of operations of the copying function is completed, the UI processor 901 sends a fax request to a fax unit 903 (step S918). The fax unit 903 receives the fax request and again sends the scan request to the scanner controller 904 (step S919). When the scanning is completed, the fax unit 903 sends a fax transmission request to a fax controller 906 (step S920). More specifically, the fax unit 903 performs the image processing immediately after an input of the image information is completed by scanning, and the fax controller 906 outputs the image information by fax transmission.

The scanner controller 904 sends a notification on processing progress to the fax unit 903 as needed (step S921). In FIG. 9, the scanner controller 904 sends the notification to the fax unit 903 every time one-page scanning is finished. The fax unit 903 receives the notification and sends a screen display request to the UI processor 901 (step S922). The UI processor 901 controls the UI and notifies the user of the number of pages having been scanned. The fax unit 903 determines that the input is completed by the notification indicating the input completion received from the scanner controller 904. Similarly, the fax controller 906 sends a notification on processing progress to the fax unit 903 as needed (step S923). In FIG. 9, the fax controller 906 sends the notification to the fax unit 903 every time one-page fax transmission is finished. The fax unit 903 receives the notification and sends a screen display request to the UI processor 901 (step S924). The UI processor 901 controls the UI and notifies the user of the number of pages having been transmitted by fax.

In the described conventional technology, however, the digital multifunction product as a single unit cannot efficiently perform a plurality of image processes because each of image processing requests are sent one by one to each corresponding unit that serves each corresponding image processing function. For example, as shown in FIG. 9, the copying unit 902 sends the scan request to the scanner controller 904 according to the copy request at step S912 while the fax unit 903 sends the same scan request to the scanner controller 904 according to the fax request at step S919. In this manner, even if requested modes to input the image information are the same, the units sending the request are different and the same processing has to be performed twice. Therefore, it is difficult for the digital multifunction product to reduce a time required for the image processes compared with that when separated devices each having a single function are collectively used.

SUMMARY OF THE INVENTION

It is an object of the present invention to at least partially solve the problems in the conventional technology.

According to an aspect of the present invention, an image processing apparatus includes a plurality of input units each configured to perform input processing including receiving input of image information; a receiving unit that receives a plurality of operation requests that indicate how the image information is to be processed; a plurality of output units configured to perform output processing including outputting processed image information; a request interpretation unit that interprets the operation requests and decides a combination of at least one first input unit among the input units and at least one first output unit among the input units corresponding to the operation requests; and an input/output-processing request unit that requests the first input unit to receive input of the image information, and requests the first output unit to output the processed image information.

According to another aspect of the present invention, a method of processing image information on an image processing apparatus including a plurality of input units each configured to perform input processing including receiving input of the image information and a plurality of output units configured to perform output processing including outputting processed image information includes receiving a plurality of operation requests that indicate how the input image information received through the input unit is to be processed; interpreting the operation requests and deciding a combination of at least one first input unit among the input units and at least one first output unit among the input units corresponding to the operation requests; and causing the first input unit to receive input of the image information and the first output unit to output the processed image information.

According to still another aspect of the present invention, a computer-readable recording medium having recorded thereon a computer program that causes a computer to perform the above method.

According to still another aspect of the present invention, a computer-readable recording medium having recorded thereon the above computer program.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
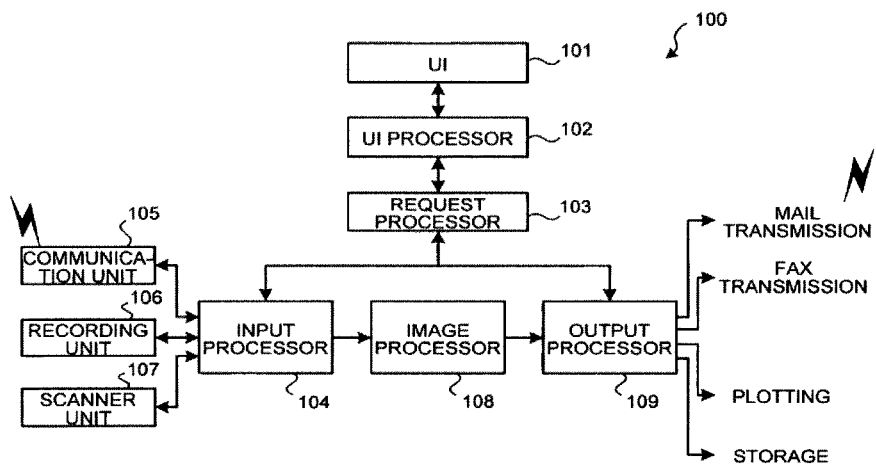
FIG. 1 is a block diagram of an image processing apparatus according to a first embodiment of the present invention.

FIG. 1 is a block diagram of an image processing apparatus 100 according to a first embodiment of the present invention. The image processing apparatus 100 includes a user interface (UI) 101, a UI processor 102, a request processor 103, an input processor 104, an image processor 108, and an output processor 109.

The UI 101 includes a display screen for reporting information related to image processing to the user. The information related to image processing includes functional information such as mail transmission, fax transmission, plotting, and storage, and information for processing progress such as print copies or a destination in each function. The UI 101 also includes an input unit that receives information related to the image processing from the user. More specifically, the input unit is a touch panel laminated on the display screen.

The UI processor 102 controls the UI 101. The UI processor 102 receives the information related to the image processing input through the UI 101 to create a request processing command. The request processing command is a command to request processes to the functions. Upon receiving a screen display request, the UI processor 102 controls the UI 101 to display information for the processing progress on the display screen.

The request processor 103 receives the request processing command, interprets the request, and decomposes the request into an input processing request and an output processing request. The request processor 103 sends the input processing request and the output processing request to the input processor 104 and the output processor 109 respectively, which are explained later, at respective timings. More specifically, when the request processing command is copying, the input processing request is scanning, and the output processing request is plotting. The timing for the requests is a timing of sending the output processing request immediately after the input processing request is sent. Upon receiving notifications on processing progresses from the input processor 104 and the output processor 109, the request processor 103 sends a screen display request to the UT processor 102.

The input processor 104 receives the input processing request from the request processor 103. The input processor 104 controls an input in response to reception of the input processing request, based on the received input processing request. The input includes inputting information received by a communication unit 105 through a server, information stored in a recording unit 106, and image information read by a scanner unit 107. The input processor 104 starts inputting information and sends a notification on processing progress to the request processor 103 as needed.

The image processor 108 subjects the image information input by the input processor 104 to image processing. The image processor 108 sends the processed data to the output processor 109. The output processor 109 receives the output processing request from the request processor 103. The output processor 109 controls the data processed by the image processor 108 so as to be output in response to reception of the output processing request, based on the received output processing request. The output includes mail transmission, fax transmission, plotting, and storage. The output processor 109 starts the output and sends a notification on processing progress to the request processor 103 as needed.

Figure 2:
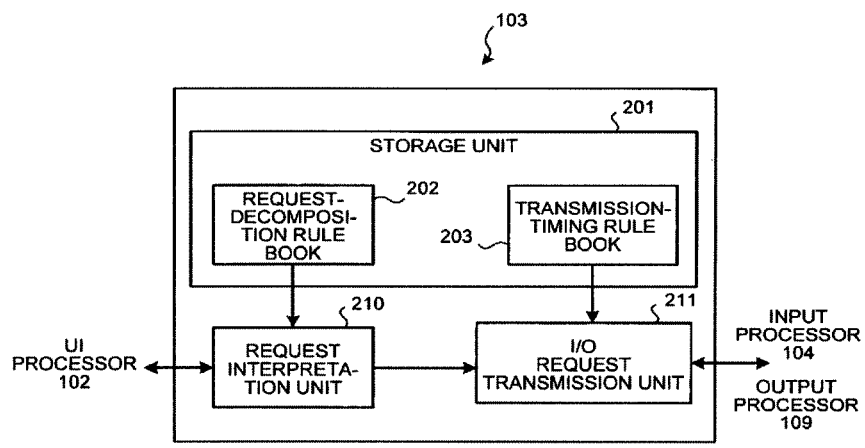
FIG. 2 is a block diagram of a request processor shown in FIG. 1.

FIG. 2 is a block diagram of the request processor 103. The request processor 103 includes a storage unit 201, a request interpretation unit 210, and an input/output (I/O)-request transmission unit 211.

The storage unit 201 stores therein information required to interpret the request processing command. The required information includes a request-decomposition rule book 202 and a transmission-timing rule book 203. The request-decomposition rule book 202 stores therein information used to determine what each request is and also used to decompose the request into a combination of an input mode and an output mode required to execute the request (see FIG. 3). The transmission-timing rule book 203 stores therein information about timing of transmitting the request decomposed into the combination of the input mode and the output mode, to the input processor 104 and the output processor 109, respectively (see FIG. 4). The storage unit 201 can be removable i.e. replaceable, or can be able to rewrite information.

The request interpretation unit 210 interprets the request processing command received from the UI processor 102 based on the request-decomposition rule book 202, and decomposes the requests into combinations of the input mode and the output mode. More specifically, when the request processing command is copying, the request interpretation unit 210 interprets the request as copying, and decomposes the request into a combination of scanning as the input and plotting as the output. This allows the request interpretation unit 210 to easily interpret processing contents even if a new image process is added. Thus, the user can easily respond to model change of the main body or to its customization.

The I/O-request transmission unit 211 transmits the input processing request obtained as the decomposed request to the input processor 104 and the output processing request obtained as the decomposed request to the output processor 109 at a timing according to the transmission-timing rule book 203. More specifically, when the request indicates copying, the I/O-request transmission unit 211 transmits the output processing request to the output processor 109 immediately after the input processing request is transmitted to the input processor 104. Thus, even if a new image process is added, the I/O-request transmission unit 211 can easily set the image process if the input mode and the output mode are not added.

Figure 3:
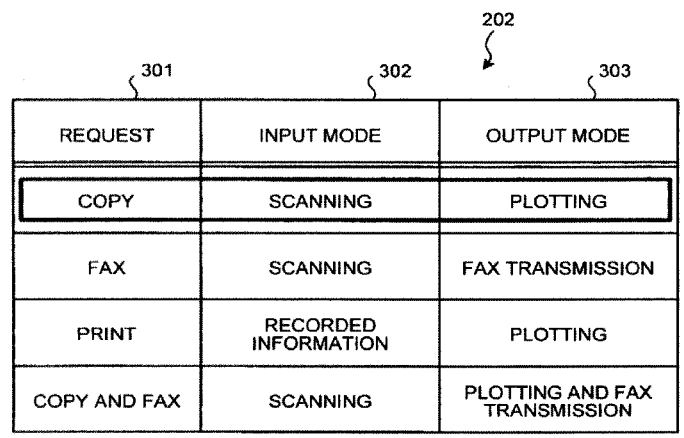
FIG. 3 is an example of contents of a request-decomposition rule book shown in FIG. 2.

FIG. 3 is an example of contents of the request-decomposition rule book 202. The request-decomposition rule book 202 stores therein information about decomposition rules in a listed manner. The decomposition rule is a rule for a combination of an input mode 302 and an output mode 303 required to execute a request 301. For example, when the request 301 is "copying", the combination of the input mode 302 and the output mode 303 is a combination of "scanning" as the input mode 302 and "plotting" as the output mode 303.

The request-decomposition rule book 202 can register therein a request to be frequently used. For example, if the request 301 indicating "copy and fax" is registered, the combination of the input mode 302 and the output mode 303 corresponding to the request 301 is a combination of "scanning" as the input mode 302 and "plotting" and "fax transmission" as the output mode 303.

The request-decomposition rule book 202 can be replaceable. More specifically, if a model-dependent decomposition rule needs to be set, for example, if a new request is added in a new model, the request-decomposition rule book 202 for a new model including a decomposition rule for a new request is created, and the request-decomposition rule book 202 is replaced with the newly created request-decomposition rule book 202. Furthermore, when it is necessary to set a user-dependent decomposition rule, for example, if it is necessary to switch an available image processing operation depending on a user, the request-decomposition rule book 202 for each user is created, and the request-decomposition rule book 202 is replaced with the newly created request-decomposition rule book 202 depending on authorization for each user. This enables the request processor 103 to reject a request processing command unauthorized for the user, by not containing a request unauthorized for the user in the request-decomposition rule book 202. Furthermore, because a storage medium with the rule stored therein is removable, there is no need to reboot the system upon change of the rule.

Figure 4:
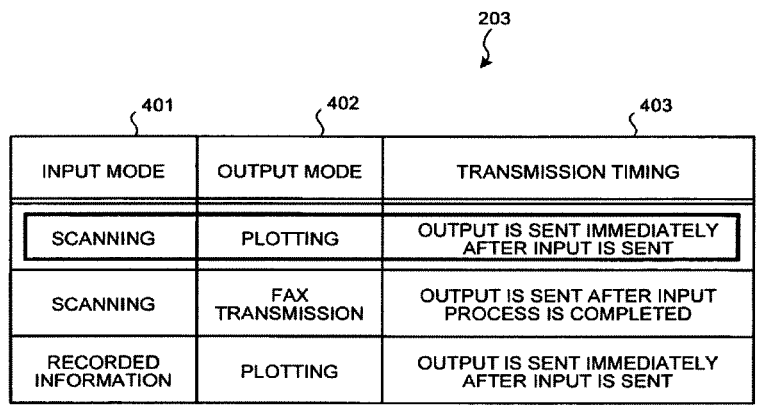
FIG. 4 is an example of contents of a transmission-timing rule book shown in FIG. 2.

FIG. 4 is an example of contents of the transmission-timing rule book 203. The transmission-timing rule book 203 contains information about transmission timing rules in a listed manner. The transmission timing rule is such that a transmission timing 403 of transmitting an input processing request and an output processing request is specified based on a combination of an input mode 401 and an output mode 402. The transmission timing 403 corresponds to the combination of the input mode 401 and the output mode 402 irrespective of the request 301 of FIG. 3. In FIG. 4, the combination of the input mode 401 and the output mode 402 indicates a combination of "scanning" as the input mode 401 and "plotting" as the output mode 402. Accordingly, the transmission timing 403 is "an output processing request is sent immediately after an input processing request is sent".

The transmission-timing rule book 203 can be replaceable. More specifically, when a model-dependent transmission timing rule needs to be set, for example, if a new request is added in a new model and a new transmission timing rule is need to be set, the transmission-timing rule book 203 for a new model including the new transmission timing rule is created, and the transmission-timing rule book 203 is replaced with the newly created transmission-timing rule book 203. Furthermore, if there is a transmission timing which cannot be implemented depending on a model, for example, if the function is restricted by a hardware configuration depending on a model, the transmission-timing rule book 203 corresponding to the model is created, and the transmission-timing rule book 203 is replaced with the newly created transmission-timing rule book 203 for each model. This enables the user to change the transmission timing depending on the model, to implement optimal performance for each model. Furthermore, because the storage medium with the rule stored therein is removable, there is no need to reboot the system upon change of the rule.

Figure 5:
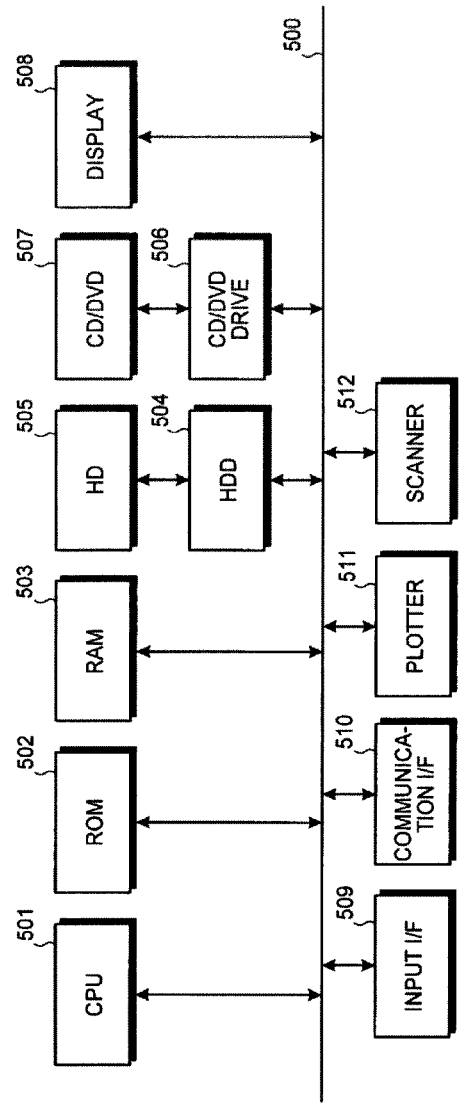
FIG. 5 is a block diagram of an example of a hardware configuration of the image processing apparatus shown in FIG. 1.

FIG. 5 is a block diagram of a hardware configuration of the image processing apparatus 100. The image processing apparatus 100 includes a Central Processing Unit (CPU) 501, a Read Only Memory (ROM) 502, a Random Access Memory (RAM) 503, a Hard Disk Drive (HDD) 504, a Hard Disk (HD) 505, a Compact Disk/Digital Versatile Disk (CD/DVD) drive 506, a CD/DVD 507, a display 508, an input interface (I/F) 509, a communication I/F 510, a plotter 511, and a scanner 512. The components 501 to 512 communicate each other through a bus 500.

The CPU 501 controls the entirety of the image processing apparatus 100. The ROM 502 stores therein various control programs. The RAM 503 is used as a work area of the CPU 501. The HDD 504 controls read/write of data from/to the HD 505 according to a control instruction of the CPU 501. The HD 505 stores therein the data written by the control of the HDD 504. The CD/DVD drive 506 controls read/write of data from/to the CD/DVD 507 according to a control instruction of the CPU 501.

The CD/DVD 507 stores therein the data written by the control of the CD/DVD drive 506 and is removable. The removable recording medium can be a Magneto-Optical (MO) Disc, a Flexible Disk (FD), and a memory card, in addition to the CD/DVD 507. The display 508 displays data such as a document, image, and function information. The display 508 is, for example, a liquid crystal display.

The input I/F 509 is a remote controller, a keyboard, or a touch panel that includes a plurality of keys to input and set characters, numerical values, and various instructions. The input I/F 509 can be implemented by any one of the remote controller, the keyboard, and the touch panel, but can also be implemented by a combination of these devices. The communication I/F 510 is connected to a telephone line, the Internet, and a Local Area Network (LAN) (not shown) through a communication line. The plotter 511 plots image information which has been subjected to image processing. The scanner 512 optically reads image information.

The function of the UI 101 is implemented by the display 508 and the input I/F 509. Similarly, the functions of the UI processor 102, the request processor 103, the input processor 104, the image processor 108, and the output processor 109 are implemented by the CPU 501, the ROM 502, and the RAM 503. The functions of the communication unit 105, the mail transmission, and the fax transmission are implemented by the communication I/F 510. The functions of the recording unit 106, the storage unit 201, and the storage are implemented by the HD 505 and the CD/DVD 507. The function of the scanner unit 107 is implemented by the scanner 512. The plotting is implemented by the plotter 511.

Figure 6:
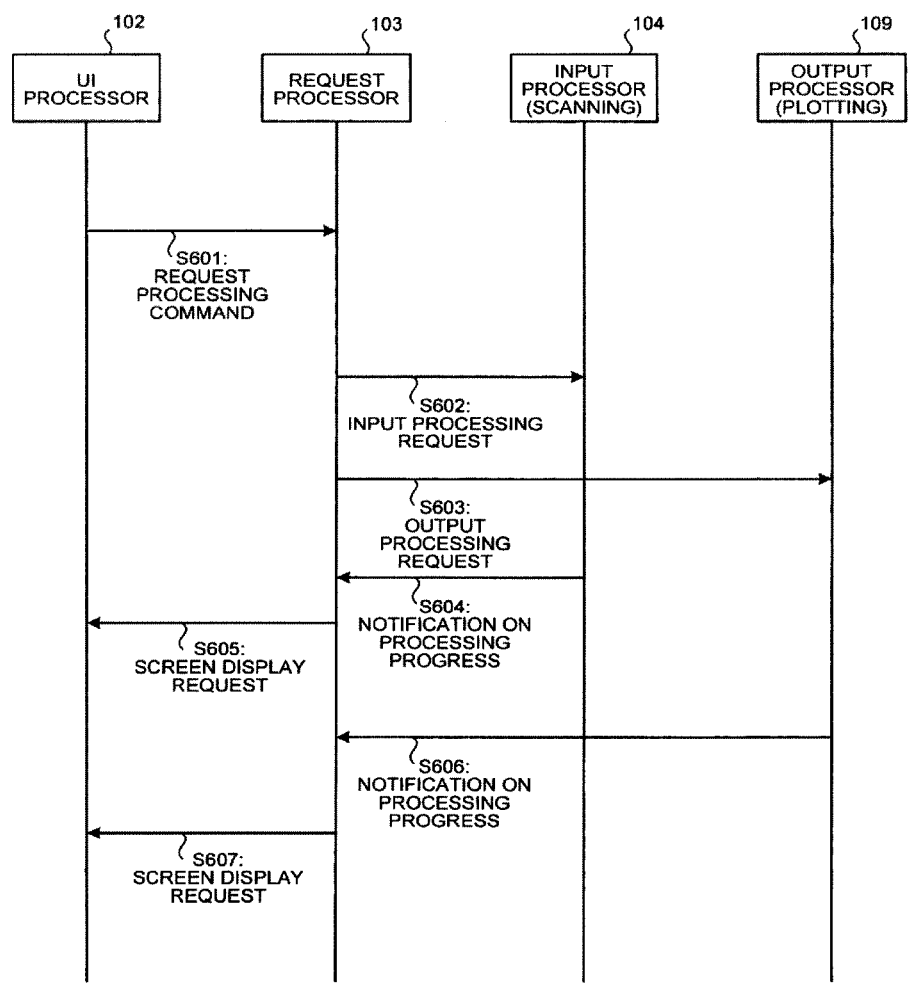
FIG. 6 is a sequence diagram of a processing for a single operation performed by the image processing apparatus shown in FIG. 1.

FIG. 6 is a sequence diagram of a processing for a single operation performed by the image processing apparatus 100. As an example of the single operation, copying is explained. The UI 101 is operated so that the UI processor 102 sends a request processing command created by the UI processor 102 to the request processor 103 (step S601). In FIG. 6, the UI processor 102 sends a copy request received from the user to the request processor 103.

The request processor 103 interprets the request based on the request processing command and decomposes the request into an input processing request and an output processing request. More specifically, the request processor 103 interprets the request as copying, and decomposes the request processing command into the input processing request (scanning) and the output processing request (plotting). The request processor 103 sends the input processing request to the input processor 104 that controls scanning, at the timing specified in the transmission-timing rule book 203 (step S602). Similarly, the request processor 103 sends the output processing request to the output processor 109 that controls plotting, at the timing specified in the transmission-timing rule book 203 (step S603).

The input processor 104 and the output processor 109 start respective processes upon reception of the input processing request and the output processing request. In FIG. 6, the request processor 103 sends the input processing request to the input processor 104. In other words, the input processor 104 controls the scanner unit 107 so as to start scanning image information. In addition, the request processor 103 sends the output processing request to the output processor 109 immediately after sending the input processing request to the input processor 104. In other words, the output processor 109 starts plotting the image information processed by the image processor 108 immediately after the scanning is started.

The input processor 104 sends a notification on processing progress to the request processor 103 as needed (step S604). In FIG. 6, the input processor 104 sends the notification to the request processor 103 every time one-page scanning is finished. The request processor 103 receives the notification and sends a screen display request to the UI processor 102 (step S605). The UI processor 102 controls the UI 101 and notifies the user of the number of pages whose scanning is finished. Similarly, the output processor 109 sends a notification on processing progress to the request processor 103 as needed (step S606). In FIG. 6, the output processor 109 sends the notification to the request processor 103 every time one-page plotting is finished. The request processor 103 receives the notification and sends a screen display request to the UI processor 102 (step S607). The UI processor 102 controls the UI 101 and notifies the user of the number of pages whose plotting is finished.

The request processing command is explained using the copying as an example in FIG. 6, but the request processing command is not limited by the copying. For example, the request processing command can be fax transmission, mail transmission, and storage.

Figure 7:
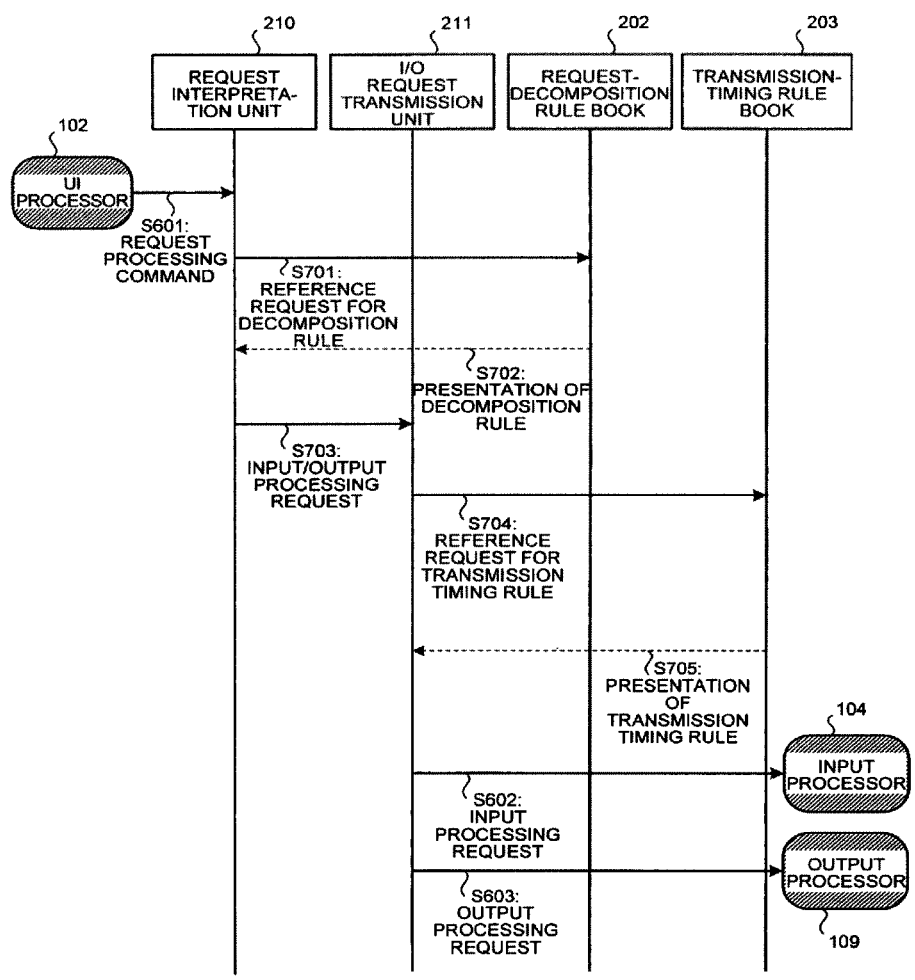
FIG. 7-is a sequence diagram of a processing performed by the request processor shown in FIG. 1.

FIG. 7 is a sequence diagram of a processing performed by the request processor 103. Because FIG. 7 includes the same processings explained in the single operation processing shown in FIG. 6, the overlapping explanation is omitted. At step S601 of FIG. 6, the UI processor 102 creates a request processing command and sends it to the request processor 103.

When the request processor 103 receives the request processing command, the request interpretation unit 210 sends a reference request for referring to the decomposition rule to the request-decomposition rule book 202 (step S701). The request-decomposition rule book 202 receives the reference request and presents the decomposition rule to the request interpretation unit 210 (step S702). The request interpretation unit 210 interprets the request according to the decomposition rule, and decomposes the request processing command into the input processing request and the output processing request.

The request interpretation unit 210 sends the input processing request and the output processing request to the I/O-request transmission unit 211 (step S703). The I/O-request transmission unit 211 receives the requests and sends a reference request for referring to the transmission timing rule to the transmission-timing rule book 203 (step S704). The transmission-timing rule book 203 receives the reference request and presents the transmission timing rule to the I/O-request transmission unit 211 (step S705). The I/O-request transmission unit 211 sends the input processing request and the output processing request to the input processor 104 and the output processor 109 respectively, at the respective timing specified in the transmission-timing rule book 203 (steps S602 and S603).

Figure 8:
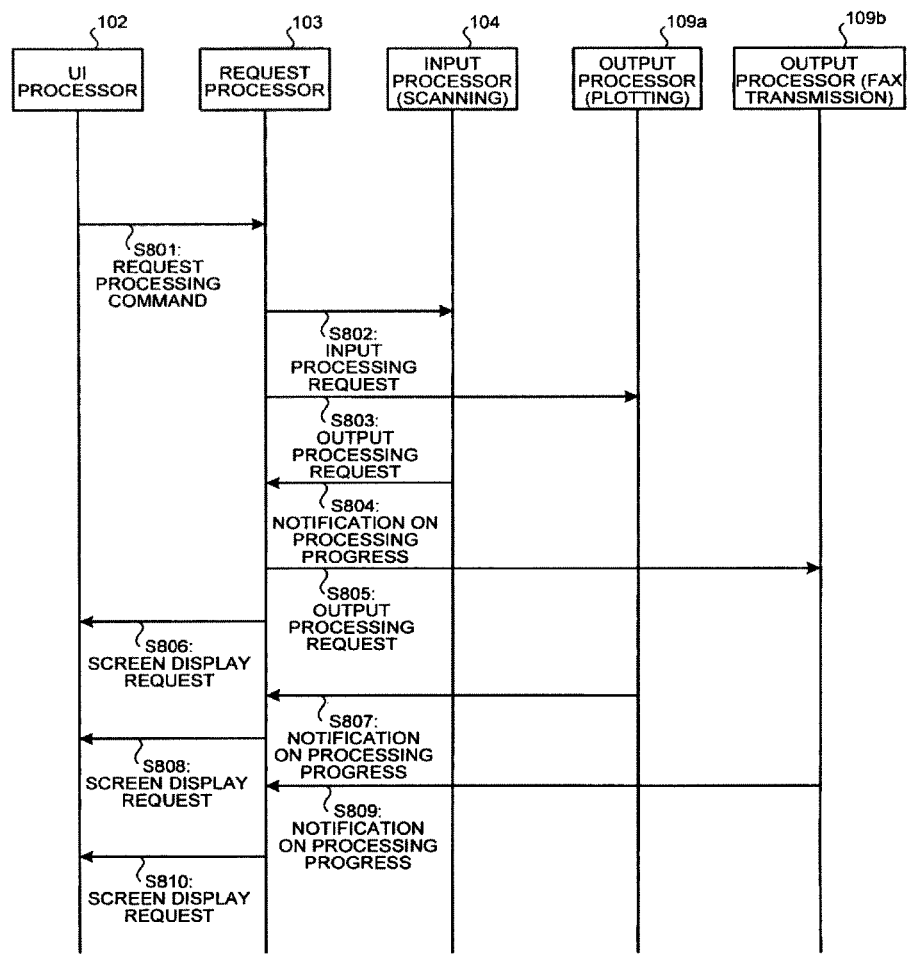
FIG. 8 is a sequence diagram of a processing for a combined operation performed by the image processing apparatus shown in FIG. 1.
Figure 9:
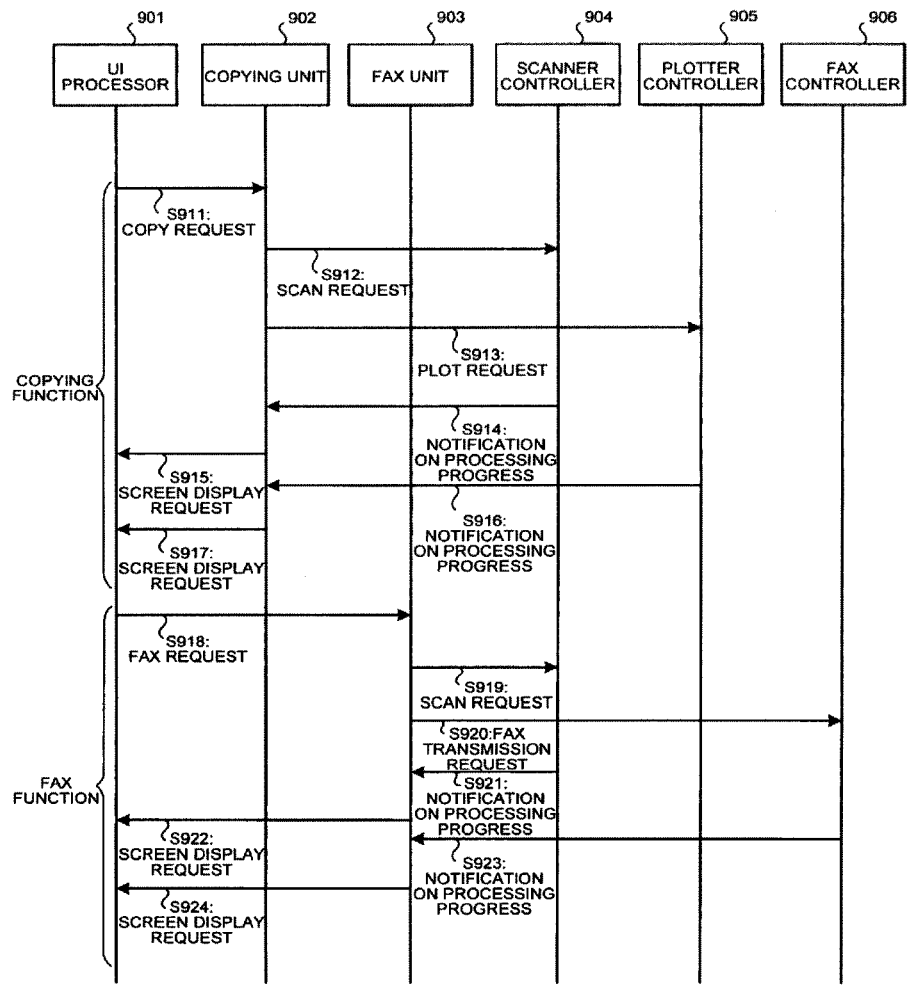
FIG. 9 is a sequence diagram of a processing for a combined operation based on the conventional technology.

FIG. 8 is a sequence diagram of a processing for a combined operation performed by the image processing apparatus 100. The combined operation is explained using the copying and fax transmission as an example. In FIG. 8, the UI 101 is operated so that the UI processor 102 sends a request processing command created by the UI processor 102 to the request processor 103 (step S801). When two or more requests are concurrently requested, the request processing command is counted as one. In FIG. 8, the UI processor 102 receives the request for the copying and fax transmission from the user.

The request processor 103 interprets the request, and decomposes the request processing command into an input processing request and an output processing request. In this case, because the request is interpreted as copying and fax transmission, both the input processing requests for the copying and fax transmission indicate scanning, while the output processing requests indicate plotting and fax transmission. The request processor 103 sends the input processing request to the input processor 104 that controls scanning, at the timing specified in the transmission-timing rule book 203 (step S802). Similarly, the request processor 103 sends the output processing request to an output processor 109a that controls plotting and also sends the output processing request to an output processor 109b that controls fax transmission, at the respective timing specified in the transmission-timing rule book 203 (steps S803 and S805).

The input processor 104 and the output processor 109 start the respective processes upon reception of the input processing request and the output processing, respectively. In FIG. 8, the request processor 103 sends the input processing request to the input processor 104. In other words, the input processor 104 controls the scanner unit 107 so as to start scanning image information. In addition, the request processor 103 sends the output processing request to the output processor 109a immediately after sending the input processing request to the input processor 104. In other words, the output processor 109a starts plotting the image information processed by the image processor 108 immediately after the scanning is started.

The input processor 104 sends a notification on processing progress to the request processor 103 as needed (step S804). In FIG. 8, the input processor 104 sends the notification to the request processor 103 every time one-page scanning is finished. When the notification by the input processor 104 indicates that all the processes are finished, the request processor 103 sends the output processing request to the output processor 109b (step S805). In other words, the output processor 109b starts fax transmission after the scanning is completed. At step S804, determination as to whether the notification indicates that all the processes are complete is performed in such a manner that when there is no input for a predetermined time, this is determined as completion of all the processes.

The request processor 103 receives the notification from the input processor 104 and sends a screen display request to the UI processor 102 (step S806). The UI processor 102 controls the UI 101 and notifies the user of the number of pages whose scanning is finished. Similarly, the output processor 109a sends a notification on processing progress to the request processor 103 as needed (step S807). In FIG. 8, the output processor 109a sends the notification to the request processor 103 every time one-page plotting is finished. The request processor 103 receives the notification and sends a screen display request to the UI processor 102 (step S808). The UI processor 102 controls the UI 101 and notifies the user of the number of pages whose plotting is finished. Furthermore, the output processor 109b sends a notification on processing progress to the request processor 103 as needed (step S809). In FIG. 8, the output processor 109b sends the notification to the request processor 103 every time one-page fax transmission is finished. The request processor 103 receives the notification and sends a screen display request to the UI processor 102 (step S810). The UI processor 102 controls the UI 101 and notifies the user of the number of pages whose fax transmission is finished.

Referring to FIG. 8, the request processing command including copying and fax transmission is explained as an example, but it is not limited thereto. For example, the request processing command can also include copying and mail transmission, copying and storage, fax transmission and mail transmission, fax transmission and storage, and mail transmission and storage. As for the request processing command, three or more requests can be concurrently sent. More specifically, as the request processing command, for example, copying-fax transmission and mail transmission-storage are concurrently requested. In both of the cases, when there is the same mode in input modes and output modes, the input processing and the output processing can be respectively performed only once. Therefore, the user can efficiently perform a plurality of image processes. Furthermore, even if the image processes required by the user are complicated, the request is interpreted by the combination of the input mode and the output mode, and this enables the user to extend a work flow.

As explained above, in the image processing apparatus, an image processing method, an image processing program, and a recording medium, the image processes for the input image information are interpreted by the combination of the input mode and the output mode. Therefore, if the same mode is included in the input modes and the output modes when the image processes are to be performed, the process is performed only once for the image processes. Thus, it is possible to reduce the time required for the image processes.

Figures 10, 11:
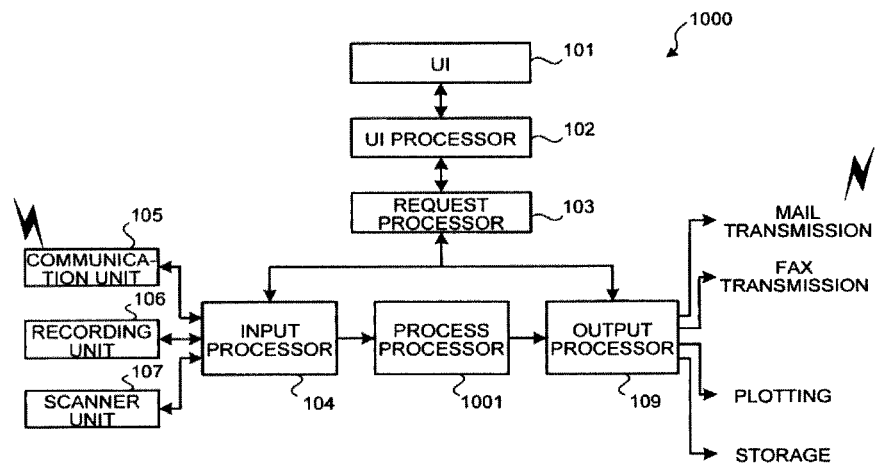
FIG. 10 is a block diagram of an image processing apparatus according to a second embodiment of the present invention.
FIG. 11 is an example of contents of a request-decomposition rule book according to the second embodiment.

FIG. 10 is a block diagram of an image processing apparatus 1000 according to a second embodiment of the present invention. In the second embodiment, the same reference numerals are assigned to the components corresponding to these of the first embodiment, and explanation thereof is omitted. The user performs a predetermined operation upon input of image information, and the digital multifunction product having the copying function can thereby perform processing according to the predetermined operation on the input image information, and output the image information. The second embodiment is an example of adding to the request-decomposition rule book 202 a process mode with which predetermined processing is further performed on the input image information.

As shown in FIG. 10, the image processing apparatus 1000 includes the UI 101, the UI processor 102, the request processor 103, the input processor 104, a process processor 1001, and the output processor 109.

The process processor 1001 uses the image information input by the input processor 104 to perform processing on the image information based on an operation of the user and based on a request-decomposition rule book 1100 explained later. The processing indicates process processing performed on the input image information according to a predetermined program. The predetermined program includes a program causing the process processor to implement the process of changing magnification (hereinafter, "scaling") of the input image information, a program causing it to rotate the input image information according to output image information, a program causing it to perform stamp printing on the input image information and to output the information, and a program causing it to perform layout.

The layout is to match a layout such as the size of a font and the dimensions of a graphic with its finish appearance. More specifically, if the request is "copy for material", then "layout" in the process mode is implemented by performing processing in such a manner that input two-page image information is laid out to form one-page image information. The process processor 1001 sends the processed data to the output processor 109. The process processor 1001 can also concurrently perform a plurality of processes such as layout and scaling.

FIG. 11 is an example of contents of the request-decomposition rule book 1100. The request-decomposition rule book 1100 stores therein information about decomposition rules in a listed manner. The decomposition rules are combination rules obtained by further adding the process mode to the decomposition rules explained in the first embodiment. More specifically, the decomposition rule is a rule combined with an input mode 1102, a process mode 1103, and an output mode 1104, which are required to execute a request 1101. The input mode 1102 is information for identifying a unit used to input image information. The process mode 1103 is information for identifying a program used to perform processing on the input image information. The output mode 1104 is information for identifying a unit used to output the input image information.

The combination rule is information in which pieces of information for identifying the particular input mode 1102, the particular process mode 1103, and the particular output mode 1104 are associated with one another for each piece of identification information to identify the request 1101. As shown in FIG. 11, if the request 1101 is "copy for material", then the combination rule for the input mode 1102, the process mode 1103, and the output mode 1104 is information such that "scanning" as the input mode 1102, "layout" as the process mode 1103, and "plotting" as the output mode 1104 are associated with one another.

Figure 12:
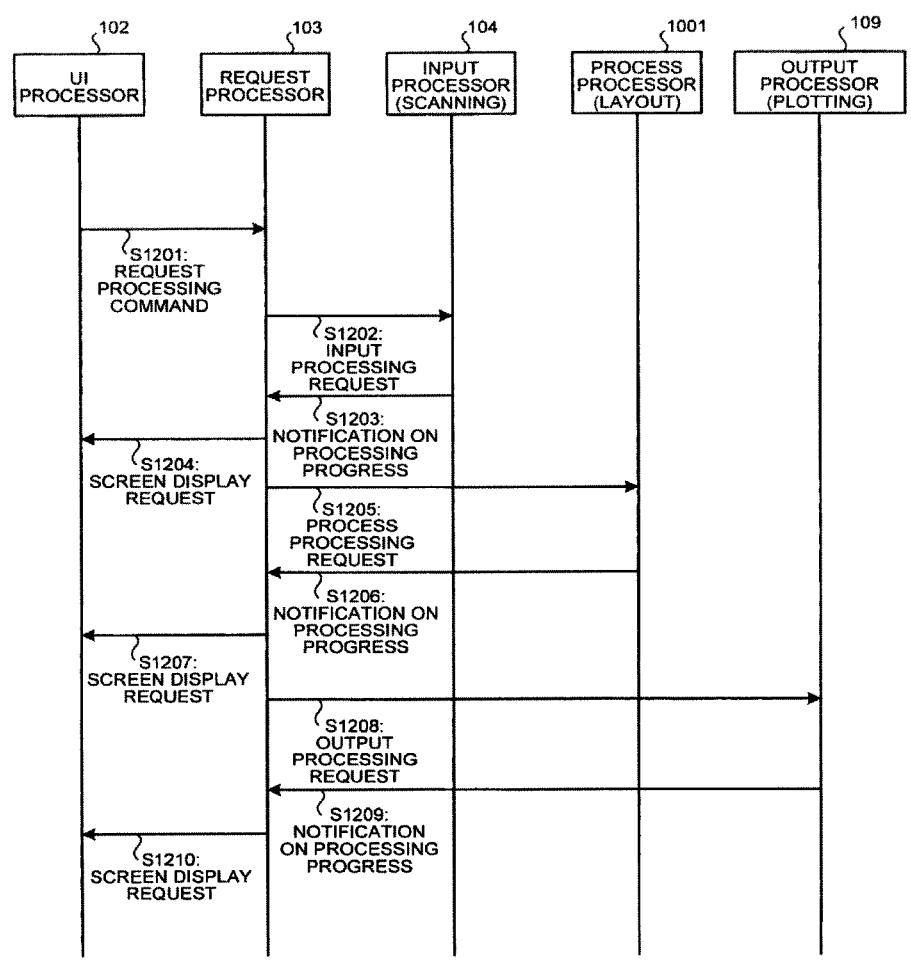
FIG. 12 is a sequence diagram of a processing performed by the image processing apparatus shown in FIG. 11.

FIG. 12 is a sequence diagram of a processing performed by the image processing apparatus 1000. An example that an operation of specifying the request 1101 to identify the "copy for material" is input is explained below. The UI 101 is operated so that the UI processor 102 sends a request processing command created by the UI processor 102 to the request processor 103 (step S1201). More specifically, when the UI 101 is operated, the UI processor 102 creates the request processing command and makes the request by outputting the created request processing command to the request processor 103.

The request processor 103 interprets the request based on the request processing command, and decomposes the request into an input processing request, a process processing request, and an output processing request. The interpretation is to identify a rule to combine the input mode 1102, the process mode 1103, and the output mode 1104, which are required to execute the request. The request processor 103 interprets the request as the copy for material, and decomposes the request processing command into the input processing request (scanning), the process processing request (layout), and the output processing request (plotting).

The request processor 103 sends the input processing request to the input processor 104 that controls scanning (step S1202). More specifically, the request processor 103 makes the request by outputting the input processing request to the input processor 104. The input processor 104 starts the processing upon reception of the input processing request. In other words, the input processor 104 controls the scanner unit 107 and starts scanning the image information.

The input processor 104 sends a notification on processing progress to the request processor 103 as needed (step S1203). In FIG. 12, the input processor 104 sends the notification to the request processor 103 every time one-page scanning is finished. The request processor 103 receives the notification and sends a screen display request to the UI processor 102 (step S1204). More specifically, the request processor 103 makes the request by outputting the screen display request to the UI processor 102. The UI processor 102 controls the UI 101 and notifies the user of the number of pages whose scanning is finished.

Upon receiving the notification from the input processor 104, the request processor 103 immediately sends the process processing request to the process processor 1001 (step S1205). More specifically, the request processor 103 makes the request by outputting the process processing request to the process processor 1001. The process processor 1001 starts the processing upon reception of the process processing request. In other words, the process processor 1001 performs, in this case, layout on the image information scanned by the scanner unit 107 according to the request-decomposition rule book 1100.

The process processor 1001 sends a notification on processing progress to the request processor 103 as needed (step S1206). In FIG. 12, the process processor 1001 sends the notification to the request processor 103 every time one-page processing is finished. The request processor 103 receives the notification and sends a screen display request to the UI processor 102 (step S1207). More specifically, the process processor 1001 makes the request by outputting the screen display request to the UI processor 102. The UI processor 102 controls the UI 101 and notifies the user of information such as "completion of image processing".

Upon receiving the notification from the process processor 1001, the request processor 103 immediately sends the output processing request to the output processor 109 that controls plotting (step S1208). More specifically, the request processor 103 makes the request by outputting the output processing request to the output processor 109. The output processor 109 starts the processing upon reception of the output processing request. In other words, the output processor 109 starts plotting the image information processed by the process processor 1001 immediately after scanning is started.

The output processor 109 sends a notification on processing progress to the request processor 103 as needed (step S1209). In FIG. 12, the output processor 109 sends the notification to the request processor 103 every time one-page plotting is finished. The request processor 103 receives the notification and sends a screen display request to the UI processor 102 (step S1210). More specifically, the request processor 103 makes the request by outputting the screen display request to the UI processor 102. The UI processor 102 controls the UI 101 and notifies the user of the number of pages whose plotting is finished.

Figure 13:
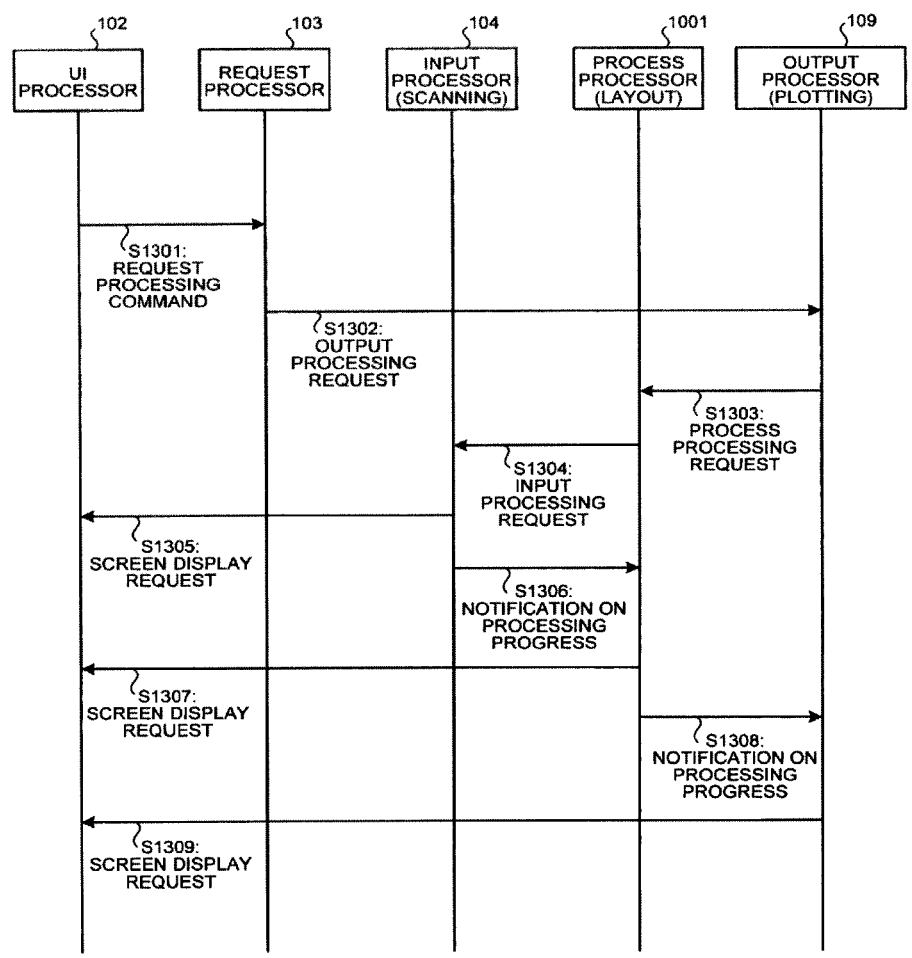
FIG. 13 is a sequence diagram of another processing performed by the image processing apparatus shown in FIG. 11.

Furthermore, even if the request processor 103 collectively sends decomposed request processing commands to the output processor 109, the process processing request is automatically sent from the output processor 109 to the process processor 1001, and the input processing request is also automatically sent from the process processor 1001 to the input processor 104, that is, the same processing as explained above is performed. FIG. 13 is a sequence diagram of another processing performed by the image processing apparatus 1000.

Similarly to FIG. 12, in FIG. 13, the operation of specifying the request 1101 to identify "copy for material" is explained below as an example. The UI 101 is operated so that the UI processor 102 sends a request processing command created by the UI processor 102 to the request processor 103 (step S1301). In FIG. 13, the UI processor 102 sends a request for copy for material received from the user to the request processor 103. More specifically, when the UI 101 is operated, the UI processor 102 creates the request processing command and makes the request by outputting the created request processing command to the request processor 103.

The request processor 103 interprets the request based on the request processing command, and decomposes the request into an input processing request, a process processing request, and an output processing request. In this case, the request processor 103 interprets the request as the copy for material, and decomposes the request processing command into the input processing request (scanning), the process processing request (layout), and the output processing request (plotting). Next, the request processor 103 collectively transmits the input processing request, the process processing request, and the output processing request to the output processor 109 (step S1302).

The output processor 109 stores therein the output processing request from among the input processing request, the process processing request, and the output processing request transmitted from the request processor 103, and sends the input processing request and the process processing request to the process processor 1001 (step S1303). The process processor 1001 stores therein the process processing request from among the input processing request and the process processing request sent from the output processor 109, and sends the input processing request to the input processor 104 (step S1304). More specifically, the process processor 1001 makes the request by outputting the input processing request to the input processor 104.

When the input processing request is sent from the process processor 1001, the input processor 104 immediately controls the scanner unit 107 to start scanning the image information. The input processor 104 finishes the input processing, and thereafter, sends a screen display request to the UI processor 102 every time one-page scanning is finished (step S1305). The UI processor 102 controls the UI 101 and notifies the user of the number of pages whose scanning is finished. The input processor 104 sends the screen display request to the UI processor 102, and sends a notification on processing progress to the process processor 1001 (step S1306).

After receiving the notification from the input processor 104, the process processor 1001 immediately starts the processing on the input image information based on the stored process processing request. The process processor 1001 finishes the processing, and thereafter, sends a screen display request to the UI processor 102 every time one-page processing is finished (step S1307). The UI processor 102 controls the UI 101 and notifies the user of a massage "completion of image processing". The process processor 1001 sends the screen display request to the UI processor 102, and sends a notification on processing progress to the output processor 109 (step S1308).

After receiving the notification from the process processor 1001, the output processor 109 immediately starts outputting the image information processed by the process processor 1001 based on the stored output processing request. The output processor 109 finishes the output processing, and sends a screen display request to the UI processor 102 every time one-page plotting is finished (step S1309). The UI processor 102 controls the UI 101 and notifies the user of the number of pages whose plotting is finished.

Figure 14:
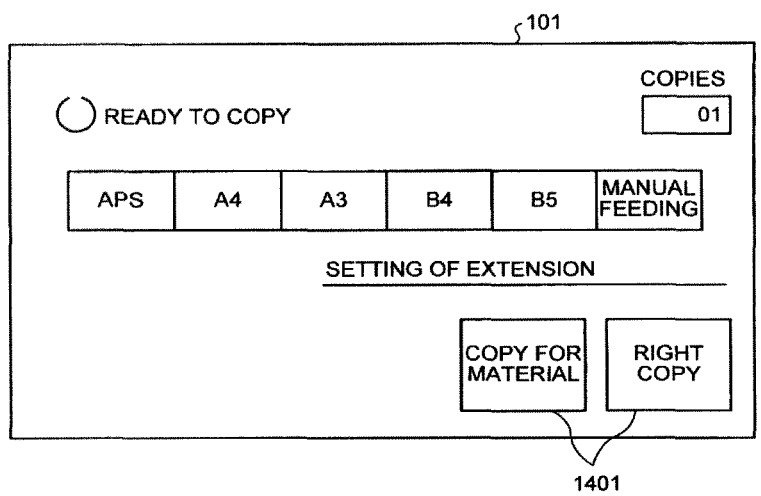
FIG. 14 is a schematic of an example of a user interface (UI) displaying request-corresponding keys according to the second embodiment.

As shown in FIG. 14, a request-corresponding key 1401 corresponding to the request 1101 of the request-decomposition rule book 1100 can be created, and the created request-corresponding key 1401 can be displayed on the UI 101 such as a touch panel. FIG. 14 is a schematic of an example of the UI 101 displaying the request-corresponding keys 1401 thereon. When the request-corresponding key 1401 is displayed on the UI 101, the user presses the request-corresponding key 1401, and the UI processor 102 creates a request processing command related to the request-corresponding key 1401. The created request processing command is decomposed by the request processor 103 according to the request-decomposition rule book 1100. This allows the user to intuitively operate the UI 101.

As explained above, the image processing apparatus 1000 includes the request processor 103 that can send a processing request to the process processor 1001, and the request-decomposition rule book 1100 can interpret the request 1101 containing the process mode 1103. Therefore, a desired request can be flexibly set.

Furthermore, when the request processor 103 collectively transmits request processing commands to the output processor 109, the process processing request is automatically sent from the output processor 109 to the process processor 1001, and the input processing request is also automatically sent from the process processor 1001 to the input processor 104. Accordingly, the number of processing requests sent by the request processor 103 can be reduced and the processing time of the request processor 103 can also be reduced.

In the explanation with reference to FIGS. 12 and 13, the request processing command is the copy for material, but the request processing command is not limited thereto. The user can also register frequently-used request processing command. Furthermore, the transmission-timing rule book can also be used after step S1202, as used in the first embodiment although it is not shown. For example, in the case of the "copy for material" shown in the second embodiment, the transmission-timing rule book will be "process (processing request) is sent after input (processing request) is sent, and immediately after sending the input, output (processing request) is sent".

In the second embodiment, the single operation (copy) in the first embodiment is explained as the example. However, the operation as shown in the second embodiment can be used for the case of the combined operations in the first embodiment. For example, input image information is processed to be copied, and the processed image information can be transmitted by fax. In the case of the combined operations, as shown in the first embodiment, the processing can be performed only once if the same mode is included in the input modes and the output modes.

The image processing method according to the first and the second embodiments can be implemented by causing a computer, such as a personal computer or a work station, to execute a previously prepared program. The program is implemented by being recorded in a computer-readable recording medium such as an HD, an FD, a Compact Disk Read Only Memory (CD-ROM), an MO, and a DVD, and being read by the computer from the recording medium. The program can also be a transmission medium capable of being distributed through a network such as the Internet.

According to an aspect of the present invention, the time required for the image processing can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising
 a plurality of processing units configured to execute data processing of data;
 a request receiving unit configured to have a mode for receiving a processing request; and
 a process execution unit configured to cause at least one specific processing unit of the plurality of processing units to execute the data processing in response to the processing request; wherein
 the plurality of processing units includes a common processing unit as one of the plurality of processing units; and
 when the processing request includes a plurality of requests that require a plurality of modes differing from each other for receiving the plurality of requests, the process execution unit causes the processing units corresponding respectively to the plurality of requests to execute the data processing thereof, without duplicating a data processing of a commonly required mode amongst the plurality of modes by using the common processing unit.

2. The apparatus as claimed in claim 1, wherein the specific processing unit executes data processing with regard to image data.

3. The apparatus as claimed in claim 2, wherein
the data processing by the plurality of processing units includes processing for outputting input data.

4. The apparatus as claimed in claim 3, wherein
the input data includes at least one of scanning data, receiving data via network and stored data in a storing unit;
the data processing includes a process for acquiring the input data and at least one of a print out process, fax transmission process and mail transmission process for outputting the input data.

5. The apparatus as claimed in claim 2, wherein the data processing by the plurality of processing units includes data processing for processing input data.

6. The apparatus as claimed in claim 5, wherein
the input data includes at least one of scanning data, data received via a network and stored data in a storing unit;
the data processing includes process for acquiring the input data and at least one of a layout process, magnification changing process, rotating process and stamp printing process for processing the input data.

7. The apparatus as claimed in claim 1, further comprising:
a request interpretation unit configured to specify one or more execution processing units based on the processing request; wherein
the process execution unit causes the specified execution processing units to execute without duplicating data processing by the common processing unit included in the execution processing units.

8. The apparatus as claimed in claim 7, further comprising:
a timing rule information storing unit configured to store timing rule information which indicates execution timing of the execution processing units corresponding to the processing request, wherein
the request interpretation unit specifies the execution processing units and the execution timing of the execution processing units based on the processing request and the timing rule information.

9. A data processing method executed by using, in an apparatus including a plurality of processing units and a request receiving unit that has a mode for receiving a processing request at least one of the plurality of processing units configured to execute data processing of data, the data processing method comprising:
a request receiving step for receiving a processing request;
a process execution step for causing at least one specific processing unit of the plurality of processing units execute, in response to the processing request; wherein
when the processing request includes a plurality of requests that require a plurality of modes differing from each other for receiving the plurality of requests, and a common processing unit is included amongst the processing units corresponding to the requests, the process execution step causes the processing units corresponding respectively to the plurality of requests to execute the data processing thereof, without duplicating data processing of a commonly required mode amongst the plurality of modes by the common processing unit.

10. The data processing method as claimed in claim 9, wherein
the specific processing unit caused to execute in the process execution step executes data processing with regard to image data.

11. The data processing method as claimed in claim 10, wherein
the data processing by the specific processing unit caused to execute in the process execution step includes processing for outputting input data.

12. The data processing method as claimed in claim 11, wherein
the input data includes at least one of scanning data, receiving data via network and stored data in a storing unit, and
the data processing includes a process for acquiring the input data and at least one of a print out process, fax transmission process and mail transmission process for outputting the input data.

13. The data processing method as claimed in claim 10, wherein
the data processing by the plurality of processing units includes data processing for processing input data.

14. The data processing method as claimed in claim 13, wherein
the input data includes at least one of scanning data, data received via a network and stored data in a storing unit;
the data processing includes process for acquiring the input data and at least one of a layout process, magnification changing process, rotating process and stamp printing process for processing the input data.

15. The data processing method as claimed in claim 9, further comprising:
a request interpretation step of specifying one or more execution processing units based on the processing request; wherein
the process execution step causes the specified execution processing units to execute without duplicating data processing by the common processing unit included in the execution processing units.

16. The data processing method as claimed in claim 15, further comprising:
storing, in a timing rule information storing unit, timing rule information which indicates execution timing of the execution processing units corresponding to the processing request, wherein
the request interpretation step specifies the execution processing units and the execution timing of the execution processing units based on the processing request and the timing rule information.

* * * * *